Patented Dec. 13, 1949

2,491,043

UNITED STATES PATENT OFFICE 2,491,043

PRODUCTION OF ALUMINUM SULFONATE

Arthur B. Hersberger, Drexel Hill, Pa., assignor to The Atlantic Refining Company, Philadelphia, Pa., a corporation of Pennsylvania No Drawing. Application June 11, 1946, Serial No. 676,102

5 Claims. (Cl. 260—448)

1

The present invention relates to a process for preparing aluminum sulfonate from a spent aluminum chloride catalyst and an oil-soluble alkali metal sulfonate.

The process of the present invention comprises reacting an aluminum chloride sludge derived from a hydrocarbon conversion process, with an oil-soluble alkali metal sulfonate such as an oil-soluble sodium or potassium petroleum sulfonate, at a temperature between 180° F. and 210° F., whereby there is formed an aluminum sulfonate, which sulfonate may thereafter be treated for the removal of byproducts of the reaction.

More specifically, a mixture of aluminum chloride sludge and an oil-soluble alkali metal sulfonate is formed, the quantity of sludge employed being such that the aluminum chloride content thereof is in excess of that required for complete reaction with the alkali metal sulfonate, i. e., preferably an excess amounting to 25% to 50% in order to insure complete conversion of the alkali metal sulfonate to aluminum sulfonate. To accelerate the reaction, water is preferably incorporated in the mixture in amounts ranging up to 50% by volume of the alkali metal sulfonate. The mixture is then heated at 180° F. to 210° F., and preferably at 190° F. to 200° F. for a sufficient time to complete the reaction, such period usually being of the order of 1 to 2 hours. During the reaction the mixture is preferably stirred by mechanical or other means, and upon completion of the reaction the byproducts and water may be removed from the aluminum sulfonate product, if desired. Such removal may be accomplished by diluting the reaction mixture with from 1 to 5 volumes of a hydrocarbon solvent and permitting the diluted mixture to settle and stratify, whereupon the lower layer comprising water and byproduct salts such as alkali metal chloride may be drawn off. The upper layer comprising the hydrocarbon solution of aluminum sulfonate may be used as such, or the solvent may be removed by distillation at atmospheric or reduced pressure. Suitable solvents include petroleum naphtha, coal tar naphtha, straight run or cracked gasoline or furnace oil, kerosine, benzene, toluene, xylene, cumene, polyalkyl benzenes, and the like.

The alkali metal sulfonates employed in accordance with this invention may be prepared by treating hydrocarbon oil with a sulfonating agent such as concentrated sulfuric acid, 98% sulfuric acid, fuming sulfuric acid, sulfur trioxide, or chlorsulfonic acid, removing the resulting acid sludge, neutralizing the sulfonated oil with an alkali such as sodium or potassium hydroxide, and extracting the alkali metal sulfonate from the oil by treatment with a solvent such as ethyl

2 alcohol-water or isopropyl alcohol-water. The crude sulfonate, after removal of the solvent, is usually a viscous material containing some oil, alkali metal sulfate, and water. Oil-soluble alkali metal sulfonates produced during the manufacture of mineral white oils, or from the sulfonation of naphthenic oils, solvent extract fractions, or olefin polymers may be suitably used in the present invention.

The spent aluminum chloride catalyst or sludge comprising essentially an aluminum chloride-hydrocarbon complex containing small amounts of hydrocarbon or tarry matter may be obtained from any one or more of a number of hydrocarbon conversion processes utilizing aluminum chloride as the catalyst. Such processes include the treating or refining of petroleum hydrocarbons such as gasoline, kerosine, lubricating oils, etc.; the polymerization of unsaturated aliphatic hydrocarbons such as olefins, i. e., ethylene, propylene, butylene, isobutylene, and higher olefins or mixtures containing same, such as a C4 fraction from petroleum oils, diolefins such as butadiene, isoprene, chlorprene, etc., and copolymers, e. g., isobutylene-butadiene, styrene-butadiene, alpha alkyl styrene, alpha alkyl styrene-butadiene, etc.; the isomerization of gaseous paraffins such as normal butane, the isomerization of normally liquid hydrocarbons such as normal pentane and hexane, as well as the isomerization of straight run gasoline to produce branched chain hydrocarbons; the cracking of petroleum hydrocarbons such as gas oil or heavier fractions to produce lighter hydrocarbons of the gasoline boiling range; and the condensation of aromatic hydrocarbons or condensible derivatives thereof with aliphatic materials such as olefins or olefin polymers, for example, the condensation of amylene or nonylene with benzene or naphthalene, or with chlorinated hydrocarbons as in the condensation of chlorinated kerosene or chlorinated wax with benzene or naphthalene, or with acyl chlorides as in the condensation of stearyl chloride with naphthalene, or with unsaturated alcohols as in the condensation of oleyl alcohols with benzene or naphthalene, etc.

The present invention may be further illustrated by the following example, which, however, is not to be construed as limiting the scope thereof.

Crude oil-soluble sodium sulfonate having a molecular weight of about 450 was obtained by treating a lubricating oil stock with fuming sulfuric acid, removing acid sludge, neutralizing the treated oil with sodium hydroxide, and extracting the resulting sodium sulfonate from the oil with a solvent consisting of a mixture of water and isopropyl alcohol. Upon removal of the solvent by distillation, there was recovered a crude sulfonate having the following composition:

| | Percent |
|---|---|
| Sodium sulfonate | 47.5 |
| Oil | 25.6 |
| Water | 25.4 |
| Inorganic salts | 1.5 |

Aluminum chloride sludge was obtained as a byproduct of the alkylation of benzene with a propylene polymer, e. g., a mixture of nonylenes, in the presence of anhydrous aluminum chloride. The sludge was separated from the alkylation products and was found to comprise a complex including the following components:

| | Percent |
|---|---|
| Aluminum chloride | 31.6 |
| Benzene | 40.0 |
| Oil heavier than benzene | 28.4 |

600 parts by weight of the crude sodium sulfonate was mixed with 134 parts by weight of aluminum chloride sludge and 150 parts by weight of water, there being about 50% excess of aluminum chloride over that required for complete reaction with the sodium sulfonate. The mixture was heated, with stirring, at a temperature of 190° F. to 200° F. for 1 hour to complete the reaction, the oil-soluble sodium sulfonate being converted into oil-soluble aluminum sulfonate. The reaction mixture was then diluted with 1224 parts by weight of blending naphtha (boiling range 195° F. to 365° F.), the aluminum sulfonate being soluble in the naphtha. The diluted mixture was then settled and the lower layer comprising water, chlorides, and sulfates was drawn off and discarded. The naphtha solution containing dissolved aluminum sulfonate and some oil was passed to storage, whence it could be used directly for certain purposes, or if desired, the naphtha could be removed by distillation to leave a viscous residue of aluminum sulfonate and oil.

The sulfonates produced in accordance with this invention have been found to be excellent additives for asphalts, road oils, bituminous paints or binders, cut-back asphalts, and the like, and when incorporated in small amounts in these materials, markedly increase the adhesivity thereof for mineral aggregates. The sulfonates may also be used in the manufacture of greases, detergent lubricating oils, and the like. When incorporating the sulfonates in road oils or asphalt cut-backs, the sulfonates may be used directly in solution in the initial hydrocarbon solvent. For some uses, it may be unnecessary to remove from the aluminum sulfonate, the byproducts from the reaction of the aluminum chloride sludge and the alkali metal sulfonate, in which case the dilution of the reaction mixture with the hydrocarbon solvent may be dispensed with, and reaction mixture simply heated to remove water, if necessary or desirable.

I claim:

1. A process for producing aluminum sulfonates, which comprises heating a mixture of aluminum chloride sludge derived from a hydrocarbon conversion process and consisting essentially of an aluminum chloride-hydrocarbon complex and an oil-soluble alkali metal petroleum sulfonate to a temperature between 180° F. and 210° F. to form aluminum sulfonate, and separating the sulfonate from the byproducts of the reaction.

2. A process for producing aluminum sulfonate, which comprises forming a mixture of aluminum chloride sludge derived from a hydrocarbon conversion process and consisting essentially of an aluminum chloride-hydrocarbon complex with an oil-soluble alkali metal petroleum sulfonate, the aluminum chloride content of the sludge being in excess of that required to completely react with the alkali metal sulfonate, heating the mixture to a temperature between 180° F. and 210° F. to form aluminum sulfonate, and separating the sulfonate from the byproducts of the reaction.

3. A process for producing aluminum sulfonate, which comprises forming a mixture of aluminum chloride sludge derived from a hydrocarbon conversion process and consisting essentially of an aluminum chloride-hydrocarbon complex with an oil-soluble alkali metal petroleum sulfonate, the aluminum chloride content of the sludge being 25% to 50% in excess of that required to completely react with the alkali metal sulfonate, heating the mixture to a temperature between 180° F. and 210° F. to form aluminum sulfonate, diluting the reaction mixture with a hydrocarbon solvent, and separating byproducts of the reaction from the resulting hydrocarbon solution of aluminum sulfonate.

4. A process for producing aluminum sulfonate, which comprises forming a mixture of aluminum chloride sludge derived from a hydrocarbon conversion process and consisting essentially of an aluminum chloride-hydrocarbon complex, an oil-soluble alkali metal petroleum sulfonate, and water, the aluminum chloride content of the sludge being 25% to 50% in excess of that required to completely react with the alkali metal sulfonate, heating the mixture to a temperature between 180° F. and 210° F. to form aluminum sulfonate, diluting the reaction mixture with naphtha, and separating water and byproduct salts from the resulting naphtha solution of aluminum sulfonate.

5. A process for producing aluminum sulfonate, which comprises mixing an aluminum chloride sludge derived from a hydrocarbon conversion process and consisting essentially of an aluminum chloride-hydrocarbon complex, with an oil-soluble sodium petroleum sulfonate, and water, heating the mixture to a temperature between 180° F. and 210° F. to form aluminum sulfonate, and separating the sulfonate from the byproducts of the reaction.

ARTHUR B. HERSBERGER.

REFERENCES CITED

The following references are of record in the file of this patent:

UNITED STATES PATENTS

| Number | Name | Date |
|---|---|---|
| 1,438,101 | Divine | Dec. 5, 1922 |
| 1,495,891 | Divine | May 27, 1924 |
| 2,180,220 | Boyd | Nov. 14, 1939 |
| 2,271,956 | Ruthruff | Feb. 3, 1942 |
| 2,279,086 | Bergstrom | Apr. 7, 1942 |
| 2,304,230 | Archibald et al. | Dec. 8, 1942 |
| 2,410,886 | Lien et al. | Nov. 12, 1946 |
| 2,413,185 | La Lande, Jr. | Dec. 24, 1946 |
| 2,430,815 | Hersberger et al. | Nov. 11, 1947 |
| 2,451,549 | Gzemski | Oct. 19, 1948 |

FOREIGN PATENTS

| Number | Country | Date |
|---|---|---|
| 10,668 of 1892 | Great Britain | Apr. 8, 1893 |